United States Patent
Su et al.

(10) Patent No.: US 11,138,081 B2
(45) Date of Patent: Oct. 5, 2021

(54) ERROR DETECTING SYSTEM, ERROR DETECTING METHOD AND IMAGE DISPLAY CONTROLLING SYSTEM

(71) Applicant: HIMAX TECHNOLOGIES LIMITED, Tainan (TW)

(72) Inventors: Ting-Mao Su, Tainan (TW); Chih-Hao Hung, Tainan (TW); Chang-Lung Wu, Tainan (TW); Huan-Sen Liao, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 123 days.

(21) Appl. No.: 16/579,767

(22) Filed: Sep. 23, 2019

(65) Prior Publication Data

US 2021/0089413 A1   Mar. 25, 2021

(51) Int. Cl.
| | |
|---|---|
| *G06F 11/00* | (2006.01) |
| *G06F 11/16* | (2006.01) |
| *G06F 11/30* | (2006.01) |
| *G06F 11/07* | (2006.01) |

(52) U.S. Cl.
CPC ........ *G06F 11/162* (2013.01); *G06F 11/0733* (2013.01); *G06F 11/0745* (2013.01); *G06F 11/3075* (2013.01)

(58) Field of Classification Search
CPC .............. G06F 11/162; G06F 11/0733; G06F 11/0745; G06F 11/3075; G06F 11/1616; G06F 11/1608

See application file for complete search history.

(56) References Cited

U.S. PATENT DOCUMENTS

| | | | | |
|---|---|---|---|---|
| 5,745,169 A | * | 4/1998 | Murphy | H04N 19/89 348/192 |
| 6,480,541 B1 | | 11/2002 | Girod | |
| 2008/0301538 A1 | * | 12/2008 | Wang | H04N 19/61 714/819 |
| 2014/0354826 A1 | * | 12/2014 | Kolarov | G06K 9/52 348/175 |
| 2015/0154943 A1 | * | 6/2015 | Lee | G09G 5/006 345/204 |
| 2016/0351129 A1 | * | 12/2016 | Kim | G09G 3/3258 |
| 2019/0013826 A1 | * | 1/2019 | Kikuta | H04N 7/183 |

FOREIGN PATENT DOCUMENTS

TW        200823801        6/2008

* cited by examiner

*Primary Examiner* — Joseph D Manoskey
(74) *Attorney, Agent, or Firm* — Winston Hsu

(57) ABSTRACT

An error detecting system, comprising: a control circuit; and a first error detecting circuit, coupled to the control circuit, configure to detect error of input data. The control circuit controls the first error detecting circuit to use a first setting to detect the error in a first time period, controls the first error detecting circuit to use a second setting to detect the error in a second time period following the first time period, and controls the first error detecting circuit to generate a first detecting result corresponding to the first setting and the second setting after the detection corresponding to the first setting and the second setting are completed.

20 Claims, 6 Drawing Sheets

(a)

(b)

ERROR DETECTING SYSTEM, ERROR DETECTING METHOD AND IMAGE DISPLAY CONTROLLING SYSTEM

BACKGROUND OF THE INVENTION

1. Field of the Invention

The present invention discloses an error detecting system, an error detecting method and an image display controlling system, and particularly relates to an error detecting system, an error detecting method and an image display controlling system which can reduce the area, the cost and the detection time of the error detecting system.

2. Description of the Prior Art

Conventionally, an error detecting system is always included in an electronic device to detect error of the input data. FIG. 1 is a block diagram illustrating a conventional error detecting system. However, a conventional error detecting system must use a single setting until all detection corresponding to the setting is completed and the detecting result corresponding to the setting is generated. For example, as illustrated in FIG. 1, the error detecting system ED_1 applies the setting 1 to detect the error of the input data IN, until the detection corresponding to the setting 1 is completed and a detect result DR_1 corresponding to the setting 1 is generated.

Therefore, if detections corresponding to different settings needed to be performed, more than one error detecting systems are needed, or the detection will take a lot of time. For example, an error detecting system ED_2, which is independent from the error detecting system ED_1, is further provided in FIG. 1 to apply the setting 2 to detect the error of the input data IN, and generates a detecting result DR_2 accordingly. Such structure may increase a cost and a size of the circuit, since more than one error detecting systems are needed.

SUMMARY OF THE INVENTION

Therefore, one objective of the present invention is to provide an error detecting system can reduce the cost and the size.

Another objective of the present invention is to provide an image display controlling method can reduce the cost and the size.

Another objective of the present invention is to provide an error detecting method can reduce the cost and the size.

One embodiment of the present invention provides an error detecting system, comprising: a control circuit; and a first error detecting circuit, coupled to the control circuit, configure to detect error of input data. The control circuit controls the first error detecting circuit to use a first setting to detect the error in a first time period, controls the first error detecting circuit to use a second setting to detect the error in a second time period following the first time period, and controls the first error detecting circuit to generate a first detecting result corresponding to the first setting and the second setting after the detection corresponding to the first setting and the second setting are completed.

Another embodiment of the present invention provides an image display controlling system, comprising: a timing controller, configured to receive input data; a driving circuit, configured to receive the input data transmitted by the timing controller and configured to control a display to display the input data; an error detecting system, provided in the timing controller or the driving circuit, comprising: a control circuit; and a first error detecting circuit, coupled to the control circuit, configure to detect error of the input data. The control circuit controls the first error detecting circuit to use a first setting to detect the error in a first time period, controls the first error detecting circuit to use a second setting to detect the error in a second time period following the first time period, and controls the first error detecting circuit to generate a first detecting result corresponding to the first setting and the second setting after the detection corresponding to the first setting and the second setting are completed.

Another embodiment of the present invention provides an error detecting method, comprising: using a first setting to detect error related with input data in a first time period by a first error detecting circuit; using a second setting to detect the error in a second time period following the first time period by the first error detecting circuit; and generating a first detecting result corresponding to the first setting and the second setting after the detection corresponding to the first setting and the second setting are completed, by the first error detecting circuit.

In view of above-mentioned embodiments, a single error detecting system can use different settings to detect errors in a time division manner, thereby the conventional cost and size problems caused by more than one error detecting systems can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note each component in following descriptions can be implemented by hardware (e.g. a circuit or a device) or by firmware (e.g. a processor with at least one program).

Figure 2:
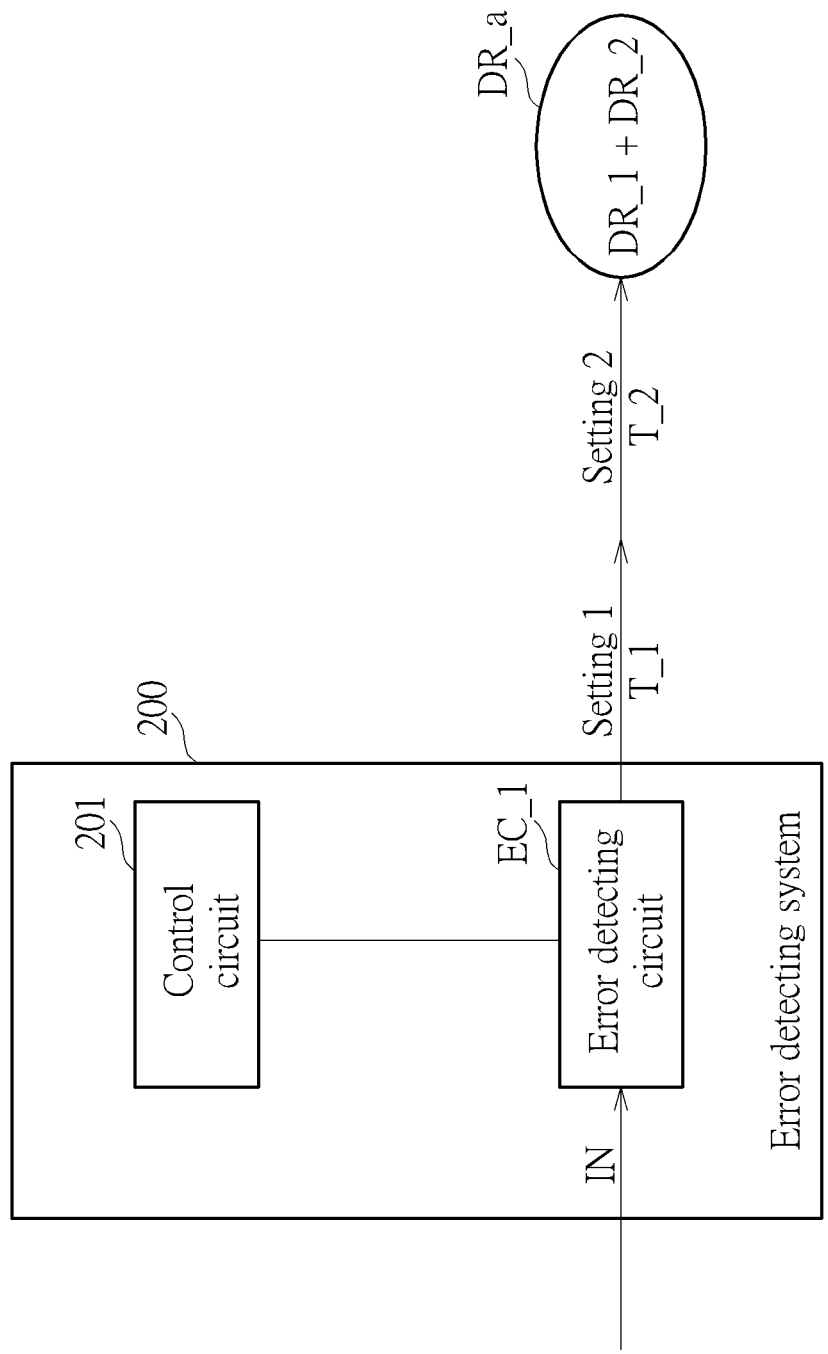
FIG. 2 is a block diagram illustrating an error detecting system according to one embodiment of the present invention.

FIG. 2 is a block diagram illustrating an error detecting system according to one embodiment of the present invention. As illustrated in FIG. 2, the error detecting system 200 comprises a control circuit 201 and an error detecting circuit EC_1. The error detecting circuit EC_1 is coupled to the control circuit 201 and is configured to detect error related with the input data IN. Please note, the "error" mentioned here can mean the error which the input data IN contains, or means the error occurs while processing the input data IN. The processing can mean, for example, transferring the input data to another circuit or another device, or transforming the input data IN from an original format to another format. Briefly, the term "error" can mean any error related with the input data IN.

The control circuit 201 controls the error detecting circuit EC_1 to use a setting 1 to detect the error in a time period T1, controls the error detecting circuit EC_1 to use a setting 2 to detect the error in a time period T_2 following the time period T_1, and controls the error detecting circuit EC_1 to generate a detecting result DR_a corresponding to the setting 1 (DR_1) and the setting 2 (DR_2) after the detection corresponding to the setting 1 and the setting 2 are completed. That is, error detecting circuit EC_1 operates in a time division manner.

The term "setting" mentioned here and illustrated in following embodiments can mean the parameters can control the operations of the error detecting system 200. The error detecting system 200 can perform detecting based on the setting, thus different settings can mean different types of detections. For example, the error detecting system 200 calculates the total data amount of the input data IN based on the setting 1, and calculates the data amount for the invalid data of the input data IN based on the setting 2.

Figure 3:
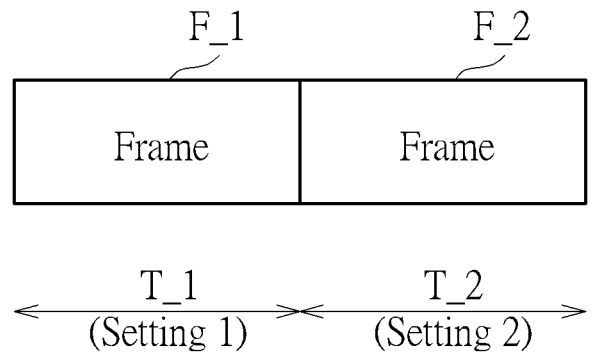
FIG. 3 is a schematic diagram illustrating the examples of time periods T_1, T_2 in FIG. 2 of the present invention.
Figure 3:
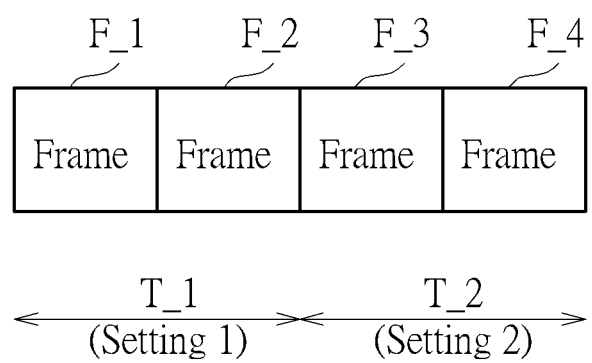

Values of the time period T_1 and the time period T_2 can be set corresponding to different requirements. In one embodiment, the input data IN is image data comprising at least one frame, the time period T_1 or the time period T_2 can mean the frame time of at least one frame. FIG. 3 is a schematic diagram illustrating the examples of time periods T_1, T_2 in FIG. 2. As illustrated in the Figure (a) of FIG. 3, the time period T_1 is frame time of the frame F_1, and the time period T_2 is frame time of the frame F_2. Further, in the Figure (b) of FIG. 3, the time period T_1 is a frame time of frames F_1 and F_2, and the time period T_2 is a frame time of frames F_3 and F 4. The term "frame time" mentioned here can mean the time for reading a frame from a storage device, the time for receiving image data of a frame, the time for writing a frame to a storage device, or the time for displaying a frame. Further, in one embodiment, the time period T_1 or the time period T_2 can be predetermined time periods. However, values of the time period T_1 or the time period T_2 are not limited to these examples.

Figure 4:
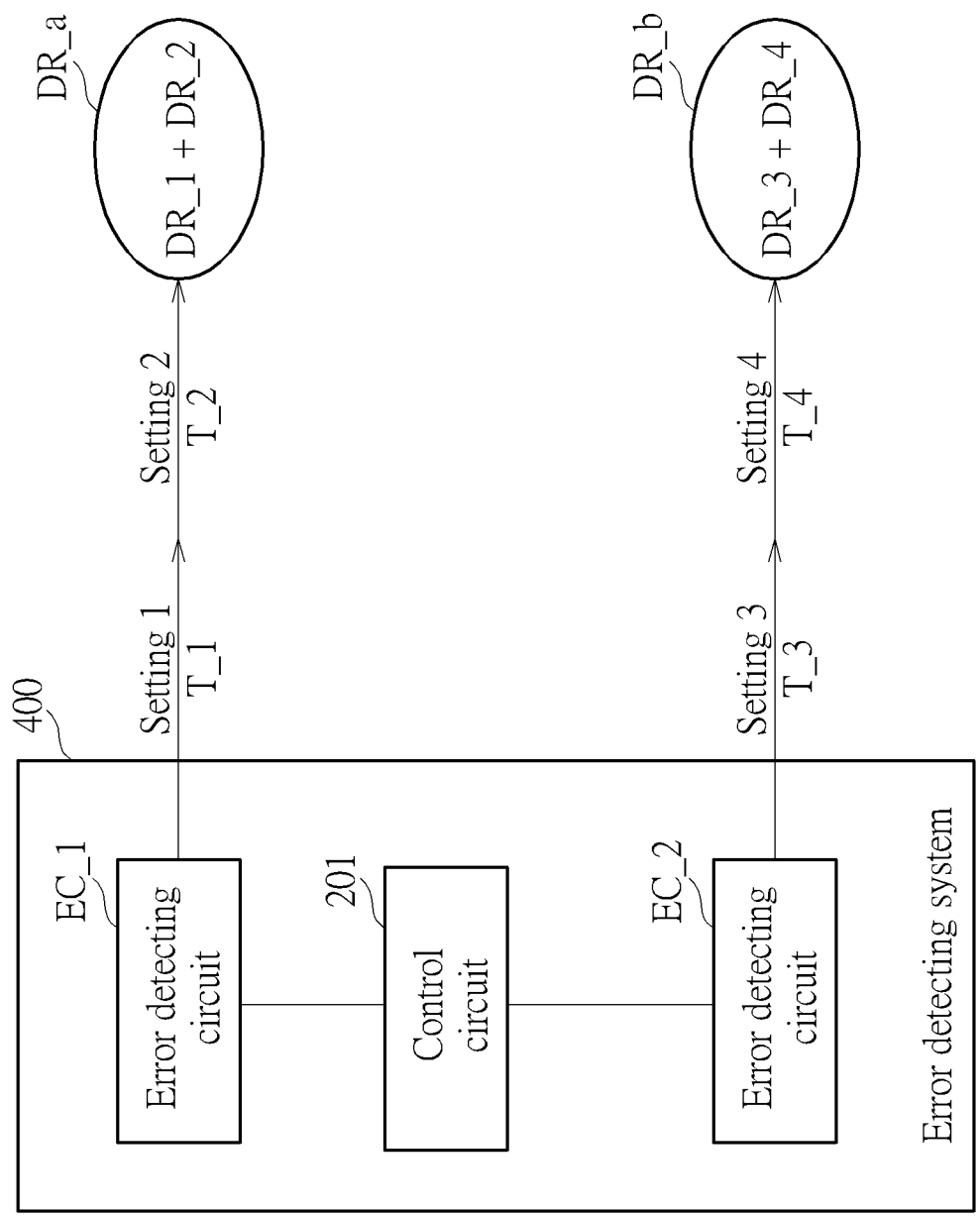
FIG. 4 is a block diagram illustrating an error detecting system according to another embodiment of the present invention.

The error detecting system provided by the present invention can comprise more than one error detecting circuit, rather than limited to the embodiment of FIG. 2. FIG. 4 is a block diagram illustrating an error detecting system according to another embodiment of the present invention. As illustrated in FIG. 4, the error detecting system 400 further comprises an error detecting circuit EC 2 besides the error detecting circuit EC_1 and the control circuit 201 illustrated in FIG. 2. The control circuit 201 controls the error detecting circuit EC 2 to use a setting 3 to detect the error in a time period T_3, controls the error detecting circuit EC 2 to use a setting 4 to detect the error in a time period T_4 following the time period T_3, and controls the error detecting circuit EC 2 to generate a detecting result DR b corresponding to the setting 3 (DR_3) and the setting 4 (DR_4) after the detection corresponding to the setting 3 and the setting 4 are completed. It will be appreciated that the time period T_3 or the time period T_4 can be the same as the period T_1 or the time period T_2, but can be different from the period T_1 or the time period T_2 as well.

Figure 5:
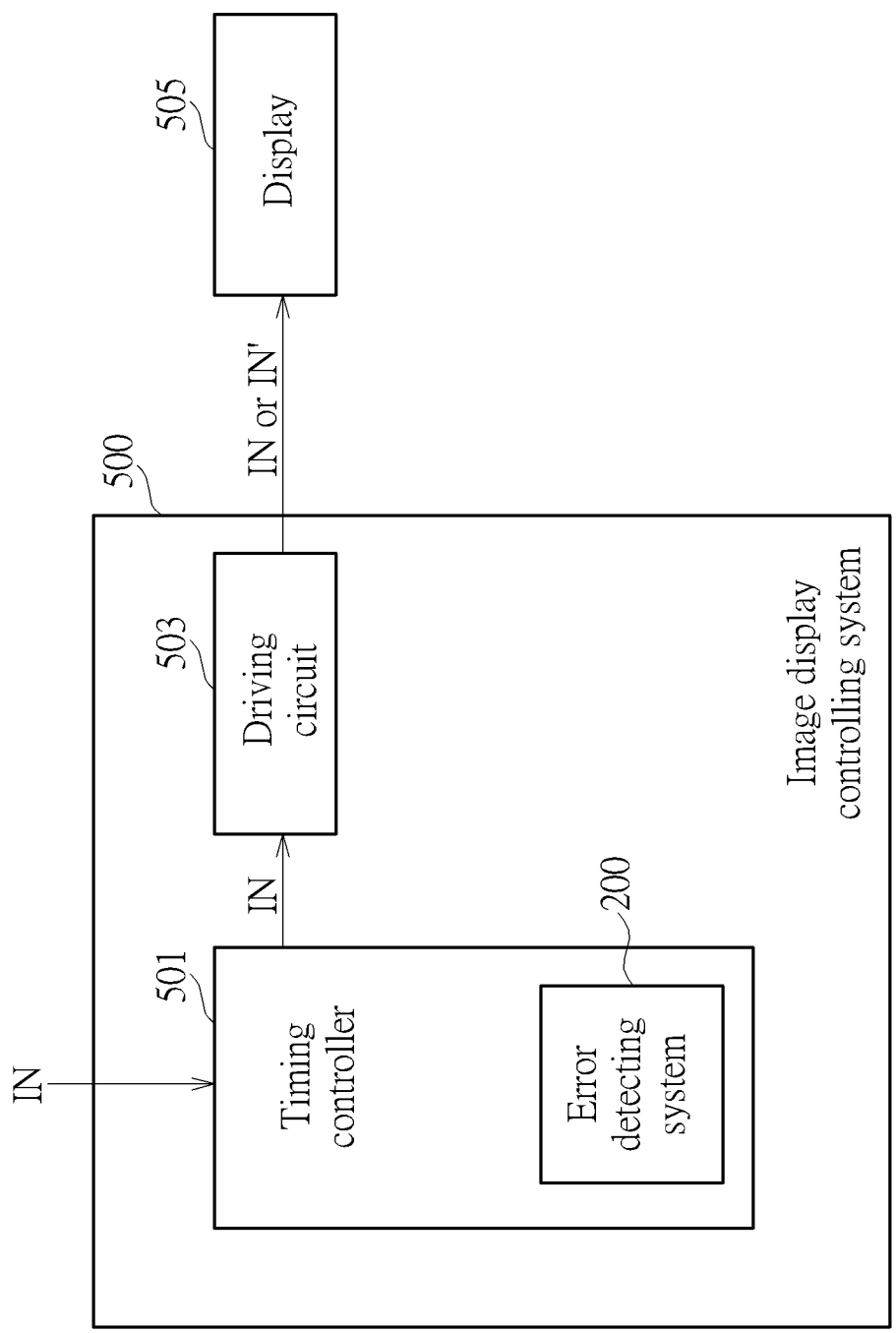
FIG. 5 is a block diagram illustrating an image display controlling system according to another embodiment of the present invention.

The above-mentioned error detecting system can be applied to any kind of electronic device or electronic system. In one embodiment, the error detecting system is applied to an image display controlling system 500, as shown in the embodiment of FIG. 5. The image display controlling system 500 comprises a timing controller 501 and a driving circuit 503. The error detecting system 200 is provided in the timing controller 501 in this embodiment. For example, the timing controller 501 can execute at least one program to perform the function of the error detecting system 200. However, the error detecting system 200 can be provided in the driving circuit 503, or provided in the timing controller 501 and the driving circuit 503, in a hardware manner or in a firmware manner.

The timing controller 501 is configured to receive input data IN which is image data, and transmits the input data IN to the driving circuit 503 in a format that the driving circuit 503 can use if the error detecting system 200 does not find any error. In such case, the driving circuit 503 is configured to transmit the input data IN to the display 505, and is configured to control the display 505 to display the input data IN. On the contrary, if the error detecting system 200 finds at least one error, the error detecting system 200 informs the timing controller 501 or the driving circuit 503 to fix the error to generate corrected input data IN'. By this way, the display 505 can show corrected input data IN' rather than the input data IN having errors.

Figure 6:
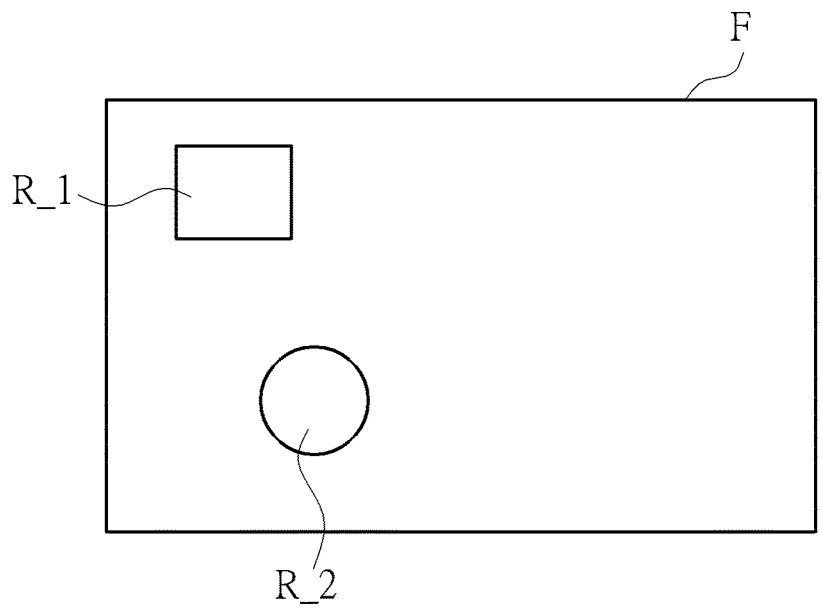
FIG. 6 is a schematic diagram illustrating an example of the input data and error detecting operation.

In one embodiment, the input data IN is image data corresponding to at least a part of a frame, and the error indicates a difference between the input data IN and the input data IN' being displayed on the display 505. FIG. 6 is a schematic diagram illustrating an example of the input data IN. As illustrated in FIG. 6, the input data IN is image data corresponding to at least part of the frame F. After the timing controller 501 receives the input data IN, the error detecting system 200 first calculates the pixel values corresponding to the regions R_1, R_2 of the frame F of the input data IN as initial image values. After the driving circuit 503 outputs the input data IN', the error detecting system 200 calculates the pixel values corresponding to the regions R_1, R_2 of the frame F of the input data IN', which will be displayed on the display 505. After that, the initial image values and the image values to be displayed are compared. By this way, the error occurs while transferring or transforming the input data IN can be detected.

However, please note, the error detecting system 200 is not limited to detect the error occurs while transferring or transforming the input data IN. For example, the error detecting system 200 can use CRC algorithm to detect the error contained in the input data IN, but not limited. The error detecting system 200 can use other mechanisms to detect errors. Besides, not only the error detecting system 200 in FIG. 2 but also the error detecting system 400 in FIG. 4 can be applied to the embodiment of FIG. 5. Additionally, an error detecting system comprising more than two error detecting circuits can also be applied to the embodiment of FIG. 5.

Figure 7:
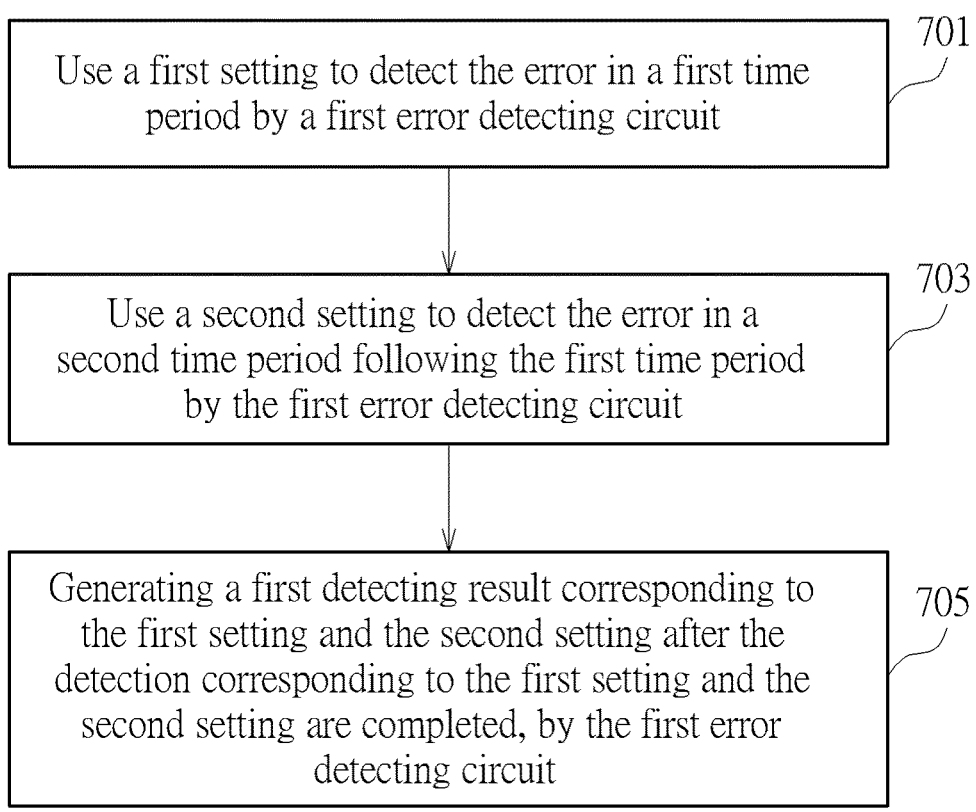
FIG. 7 is a flow chart illustrating an error detecting method according to one embodiment of the present invention.

In view of above-mentioned embodiments, an error detecting method can be acquired. FIG. 7 is a flow chart illustrating an error detecting method according to one embodiment of the present invention. FIG. 7 comprises following steps:

Step 701

Figure 1:
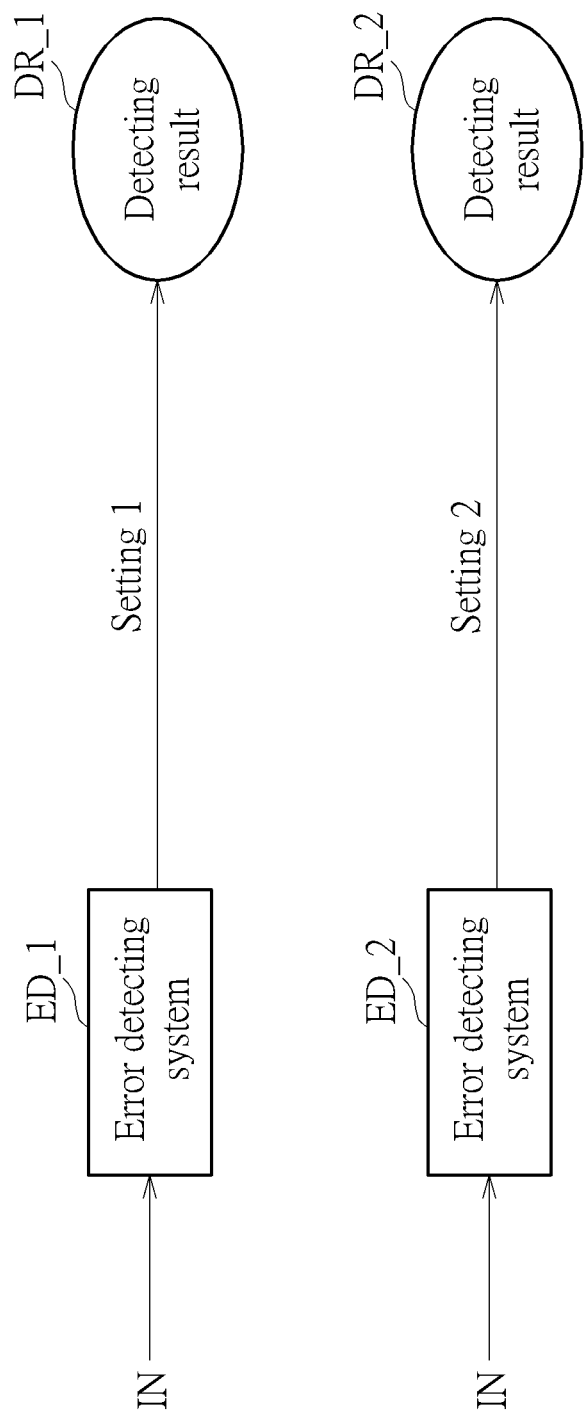
FIG. 1 is a block diagram illustrating a conventional error detecting system.

Use a first setting to detect the error in a first time period by a first error detecting circuit (e.g. the first error detecting circuit EC_1 in FIG. 1).

Step 703

Use a second setting to detect the error in a second time period following the first time period by the first error detecting circuit.

Step 705

Generating a first detecting result (e.g. the detecting result DR_a in FIG. 1) corresponding to the first setting and the second setting after the detection corresponding to the first setting and the second setting are completed, by the first error detecting circuit.

In view of above-mentioned embodiments, a single error detecting system can use different settings to detect errors in a time division manner, thereby the conventional cost and size problems caused by more than one error detecting systems can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An error detecting system, comprising:
   a control circuit; and
   a first error detecting circuit, coupled to the control circuit, configure to detect error of input data;
   wherein the control circuit controls the first error detecting circuit to use a first setting to detect the error in a first time period, controls the first error detecting circuit to use a second setting to detect the error in a second time period following the first time period, and controls the first error detecting circuit to generate a first detecting result corresponding to the first setting and the second setting after the detection corresponding to the first setting and the second setting are completed.

2. The error detecting system of claim 1, wherein the input data is image data, the first time period is a frame time of a first frame, and the second time period is a frame time of a second frame following a first frame.

3. The error detecting system of claim 1, wherein the input data is image data, the first time period is a frame time of a first frame and a second frame following the first frame, and the second time period is a frame time of a third frame following the second frame and a fourth frame following the third frame.

4. The error detecting system of claim 1, wherein the first time period and the second time period are predetermined time periods.

5. The error detecting system of claim 1, further comprising:
   a second error detecting circuit, coupled to the control circuit, configure to detect error of input data;
   wherein the control circuit controls the second error detecting circuit to use a third setting to detect the error in a third time period, controls the second error detecting circuit to use a fourth setting to detect the error in a fourth time period, and controls the second error detecting circuit to generate a second detecting result corresponding to the third setting and the fourth setting after the detection corresponding to the third setting and the fourth setting are completed.

6. The error detecting system of claim 1, wherein the input data is image data corresponding to at least a part of a frame.

7. The error detecting system of claim 6, wherein the error indicates a difference between the input data and the input data being displayed on a display.

8. An image display controlling system, comprising:
   a timing controller, configured to receive input data;
   a driving circuit, configured to receive the input data transmitted by the timing controller and configured to control a display to display the input data or corrected input data according to a first detecting result;
   an error detecting system, provided in the timing controller or the driving circuit, comprising:
      a control circuit; and
      a first error detecting circuit, coupled to the control circuit, configure to detect error of the input data;
   wherein the control circuit controls the first error detecting circuit to use a first setting to detect the error in a first time period, controls the first error detecting circuit to use a second setting to detect the error in a second time period following the first time period, and controls the first error detecting circuit to generate the first detecting result corresponding to the first setting and the second setting after the detection corresponding to the first setting and the second setting are completed.

9. The image display controlling system of claim 8, wherein the input data is image data, the first time period is a frame time of a first frame, and the second time period is a frame time of a second frame following a first frame.

10. The image display controlling system of claim 8, wherein the input data is image data, the first time period is a frame time of a first frame and a second frame following the first frame, and the second time period is a frame time of a third frame following the second frame and a fourth frame following the third frame.

11. The image display controlling system of claim 8, wherein the first time period and the second time period are predetermined time periods.

12. The image display controlling system of claim 8, wherein the error detecting system further comprises:
    a second error detecting circuit, coupled to the control circuit, configure to detect error of input data;
    wherein the control circuit controls the second error detecting circuit to use a third setting to detect the error in a third time period, controls the second error detecting circuit to use a fourth setting to detect the error in a fourth time period, and controls the second error detecting circuit to generate a second detecting result corresponding to the third setting and the fourth setting after the detection corresponding to the third setting and the fourth setting are completed.

13. The image display controlling system of claim 8, wherein the input data is image data corresponding to at least a part of a frame.

14. The image display controlling system of claim 13, wherein the error indicates a difference between the input data and the input data being displayed on a display.

15. An error detecting method, comprising:
    using a first setting to detect error related with input data in a first time period by a first error detecting circuit;
    using a second setting to detect the error in a second time period following the first time period by the first error detecting circuit; and
    generating a first detecting result corresponding to the first setting and the second setting after the detection corresponding to the first setting and the second setting are completed, by the first error detecting circuit.

16. The error detecting method of claim 15, wherein the input data is image data, the first time period is a frame time of a first frame, and the second time period is a frame time of a second frame following a first frame.

17. The error detecting method of claim 15, wherein the input data is image data, the first time period is a frame time of a first frame and a second frame following the first frame, and the second time period is a frame time of a third frame following the second frame and a fourth frame following the third frame.

18. The error detecting method of claim 15, further comprising:
   using a third setting to detect the error in a third time period;
   using a fourth setting to detect the error in a fourth time period; and
   generating a second detecting result corresponding to the third setting and the fourth setting after the detection corresponding to the third setting and the fourth setting are completed.

19. The error detecting method of claim 15, wherein the input data is image data corresponding to at least a part of a frame.

20. The error detecting method of claim 19, wherein the error indicates a difference between the input data and the input data being displayed on a display.

* * * * *